July 16, 1957
E. E. EBERLE
2,799,826
WATTMETER SELF-BALANCING BRIDGE APPARATUS
Filed March 5, 1952
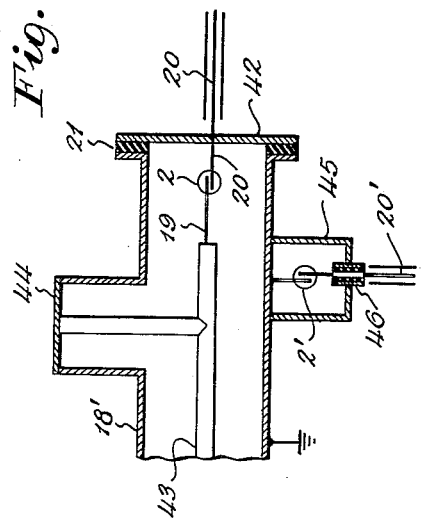
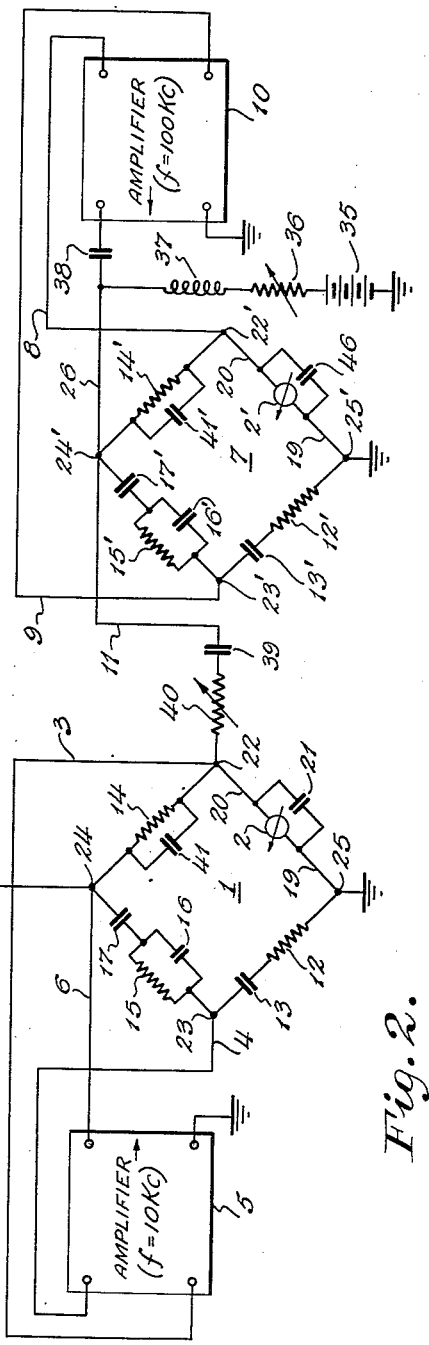
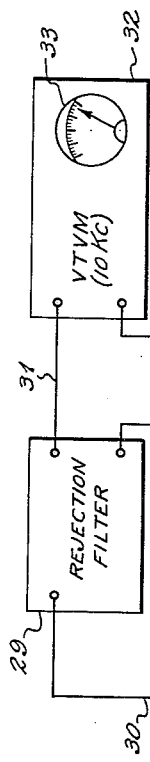
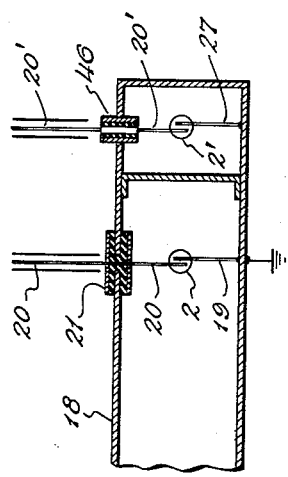
INVENTOR
*EDWARD E. EBERLE*
BY
*Paul B. Hunter*
ATTORNEY

2,799,826

WATTMETER SELF-BALANCING BRIDGE APPARATUS

Edward E. Eberle, Floral Park, N. Y., assignor to Sperry Rand Corporation, a corporation of Delaware Application March 5, 1952, Serial No. 274,871

13 Claims. (Cl. 324—95)

This invention relates generally to devices for measuring radio frequency power, and the invention has reference more particularly to a novel wattmeter self-balancing bridge apparatus especially suitable for measuring radio frequency power in the ultra high and microwave frequency ranges.

In high frequency power measuring devices heretofore used, extreme difficulty has been encountered in accurately compensating for changes in ambient temperature. Also few of these prior art devices are automatic in their measuring action, and most of them require manual resetting for each measurement made. Where automatic measuring equipment has been used, it has been found generally insufficiently accurate under all operating conditions for obtaining precise measurements.

The principal object of the present invention is to provide a novel microwave wattmeter self-balancing bridge apparatus utilizing a pair of self-balancing bridges, one of which operates at a desired frequency and contains a bolometer element reacting to ambient temperatures only, whereas the other bridge, containing a substantially identical bolometer element, operating at a different frequency, measures radio frequency power in the ultra-high and microwave frequency ranges by the substitution method, the first bridge serving to automatically correct the indicated power for ambient temperature changes.

Another object of the present invention is to provide a novel wattmeter self-balancing bridge apparatus having a relatively wide ambient temperature control through use of bolometer elements of substantially the same characteristics, one for radio frequency power measurement and the other for temperature compensation, thereby obtaining close tracking over a considerable ambient temperature range.

In carrying out the principles of the present invention, two bridges of the self-balancing type are employed, one bridge is the master bridge insofar as ambient temperature control is concerned, but the second bridge is independent of the first for radio frequency power measurement indications. Each bridge has a bolometer, that of the first bridge in normal operation serving to respond simply to changes in ambient temperatures, whereas the bolometer of the second bridge is sensitive to radio frequency power changes. The power level indication results from a replacement of low frequency power by radio frequency power so that the overall power on the bolometer of the power measuring bridge remains constant. Concomitant low frequency power in an amount proportional to that applied to the bolometer is fed to a vacuum tube voltmeter preferably calibrated to read in radio frequency power directly, thereby overcoming the disadvantage of relying upon the linearity of bolometer resistance changes with power level changes, as obtains in one prior art device exemplified by Patent No. 2,565,- 922. In use, the apparatus of this patent is further restricted to a relatively low power range measurement, whereas the device of this invention has a relatively large power range measurement by virtue of utilizing more fully the inherent measurement range of the bolometer.

A version of the novel wattmeter self-balancing bridge apparatus of this invention will now be described with reference to the drawings, wherein:

Fig. 1 is a schematic circuit diagram of the apparatus of this invention;

Fig. 2 is a detail of construction showing one manner of associating the bolometer elements with a wave guide carrying radio frequency energy; and Fig. 3 is also a detail of construction showing one manner of associating the bolometers with a concentric line carrying radio frequency energy.

Referring now to Fig. 1, a bridge 1, as of the Wien type, contains a bolometer element 2 in one arm thereof. Bolometer 2 is a thermally sensitive resistance element, i. e. an element having a high temperature coefficient of resistivity. A conjugate arm of the bridge is shown containing a resistance 12 and condenser 13, while the other arms of the bridge contain resistor 14 and parallel condenser 41, parallel connected resistor 15 and condenser 16 and a series connected condenser 17. Bolometer 2 may be in the form of a thermistor or barretter element. This bolometer is adapted to be supplied with the radio frequency energy to be measured. Thus, in Fig. 2, the bolometer 2 is shown as having the form of a thermistor, which is mounted within a wave guide 18, so as to be heated by the electromagnetic energy traveling within the guide. One side of the thermistor 2 is directly connected to one wall of guide 18 by lead 19, while the other side of the thermistor is connected by a lead 20 and a small capacity 21 to the opposite wall of the wave guide 18, thereby providing a low impedance for radio frequency currents through the thermistor while presenting a high impedance to D. C. and audio currents, so that such currents are compelled to pass through the thermistor 2 to reach ground.

In those instances where the wave guide 18 is located at a distance from the bridge 1, the lead 20 should be shielded as shown in Fig. 2 to prevent stray pick-up. Opposite points 22 and 23 of the bridge 1 are connected by leads 3 and 4 to the input of an amplifier 5, and the other points 24 and 25 of this bridge are connected through lead 6 and ground to the output of the amplifier. Amplifier 5 and bridge 1 form a regenerative loop oscillating at a suitable low frequency which may be of the order of 10 kilocycles, for example.

A second Wien type bridge 7 is also provided with a bolometer element 2', which is essentially identical with bolometer 2, bolometer 2' being sensitive to the same ambient temperatures affecting bolometer 2. Parts of bridge 7 that are similar to corresponding parts of bridge 1 are similarly numbered but with primes affixed. Bridge 7 has opposite points 22' and 23' thereof connected through leads 8 and 9 to the input side of an amplifier 10, whereas the other pair of opposite points 24' and 25' of this bridge are connected through lead 26 and ground to the output of this amplifier 10. Amplifier 10 and bridge 7 form a regenerative loop which may oscillate at a frequency of 100 kilocycles for example, a frequency that is sufficiently higher than that of the circuit comprising bridge 1 and amplifier 5, so as to facilitate separation of these frequencies by filtering. The opposite points 24' and 25' of bridge 7 are connected by lead 11 containing condenser 39 and rheostat 40 to point 22 and ground point 25 respectively of bridge 1, i. e. across the arm thereof containing bolometer 2.

Bolometer 2' is positioned close to bolometer 2 so as to experience the same ambient temperature changes as bolometer 2 at all times. Bolometer 2' may be mounted as shown in Fig. 2 of the drawings, wherein the same is shown as positioned in an extension of the wave guide 18 containing no electromagnetic field. One side of thermistor 2' is shown connected through lead 27 to a wall of guide 18, whereas the other side of this thermistor is connected to lead 20' through an aperture in the other wall of the wave guide 18 and insulated therefrom. Small capacitor 46 is shown connected to lead 20' and ground to simulate at 2' the shunt capacity of 21 at 2.

A rejection filter 29 is connected by lead 30 to point 24 of bridge 1, and the opposite point of this bridge is connected by ground also to this rejection filter. This filter is adapted to pass the 10 kilocycle frequency of regenerative loop 1—5 and rejects the 100 kilocycle frequency of loop 7—10. The output of this filter is connected by lead 31 and ground to the vacuum tube voltmeter 32 having an indicator 33. The indicator 33 is preferably calibrated in power units for indicating the amount of radio frequency power absorbed by bolometer 2.

A constant voltage supply 35 supplies D. C. potential through a high impedance circuit comprising an adjustable resistor 36 and a choke coil 37 to point 24' of bridge 7 through lead 26. Amplifier 10 is suitably isolated from this direct current supply over lead 26, as by condenser 38.

In operation, at constant ambient temperature the total input power to bolometer 2' of bridge 7 is a constant. When the rheostat 36 is adjusted so that no direct current is supplied to bolometer 2', the balance of bridge 7 is obtained entirely by the 100 kc. from amplifier 10 heating bolometer 2' substantially to a value required for perfect balance. A slight unbalance of bridge 7 is always present in order that there shall be a slight feedback of energy to the amplifier 10 so that this amplifier can deliver just enough power to the bridge to support a virtual bridge balance such that the loop voltage gain shall be unity.

The introduction of direct current power from source 35 to bolometer 2' by adjustment of rheostat 36 results in the following action: Extra heating of 2' by the D. C. power tends to change the resistance of 2' to more perfectly balance the bridge resulting in reductions of the feedback input to amplifier 10, the output therefrom and the 100 kc. power delivered to 2'; so that the bolometer 2' tends to cool off and approach its original resistance. This action continues until the resistance of 2' and the total power consumed in 2' before the D. C. was introduced are restored. Thus, the adjustment of rheostat 36 controls the amount of 100 kc. passing through 2', or looked at differently, as the D. C. power is increased (or reduced) the 100 kc. power decreases (or increases) in equal amount in 2'. If desired, the 100 kc. power can be reduced to zero by sufficient application of D. C.

Simultaneously with the supply of 100 kc. to bridge 7, a portion of this supply passes through lead 11, condenser 39, rheostat 40 and bolometer 2 back through ground to amplifier 10. The impedance of rheostat 40 and condenser 39 is approximately equal to that of parallel connected resistance 14' and condenser 41' of bridge 7 so that substantially the same amount of 100 kc. flows through both bolometers 2 and 2'.

In use, just as the amplitude of 100 kc. in bolometer 2' was controlled by the amount of D. C. supplied from source 35, likewise the amplitude of 10 kc. flowing from amplifier 5 into bolometer 2 is controlled by the amount of 100 kc. supplied from amplifier 10 over lead 11 to this bolometer. Preparatory to making a measurement of radio frequency power by the apparatus, the rheostat 36 is adjusted so that the amount of 10 kc. energizing the vacuum tube voltmeter 32 and hence the bolometer 2 is a maximum, i. e. with no radio frequency power flowing into the bolometer 2. This positioning of meter 33 is commonly known as zero setting.

To make a radio frequency power measurement such radio frequency energy is supplied to the bolometer 2, as by passage down the wave guide 18, thereby resulting in a corresponding decrease of 10 kc. power delivered to bolometer 2. Meter 33 is calibrated so as to directly indicate radio frequency power supplied to the bolometer 2 corresponding to the decrease in 10 kc. in this bolometer.

In the event of any change in ambient temperature, such as a drop therein, in the absence of bridge 7, the 10 kc. power fed to bolometer 2 would have to be increased to maintain the same operating resistance of this bolometer, and this would automatically occur and cause an error in the reading of indicator 33, which error is known as zero drift. However, as soon as the ambient temperature starts to drop, the power requirements of bolometer 2' likewise increases, so that more 100 kc. is fed both to bolometer 2' and to bolometer 2, thereby automatically compensating for the drop in temperature and preventing zero drift of meter 33.

The bolometers 2 and 2' may not possess strictly identical power-temperature characteristics, in which case the rheostat 40 can be adjusted so that a differential in 100 kc. power is supplied to these two bolometers. Thus, as the ambient temperature changes, the proper amount of power is supplied to the bolometer 2 to produce an accurate reading of indicator 32. The correction thus obtained can be accurate over a wide ambient temperature change such as obtains in use. Once rheostat 40 is set for a certain pair of bolometers 2 and 2', this rheostat ordinarily need not be changed again. Resistor 36 can be adjusted to change the indicated radio frequency power range of meter 33 accompanied by a corresponding change in vacuum tube voltmeter sensitivity.

In Fig. 3, the bolometers 2 and 2' are shown used in association with a concentric line 18' instead of with a wave guide. In this figure, the lead 20 extends through a cylindrical end plate 42 of the concentric line to the thermistor 2 and from thence via lead 19 to the concentric line inner conductor 43, which is grounded for D. C. via the stub line 44. Thus, one side of the thermistor 2 is directly connected to ground while the other side of the thermistor is connected by lead 20, end plate 42, and a small capacitor 21 to the outer conductor 18', thereby providing a low impedance for radio frequency current through the thermistor, while presenting a high impedance to D. C. and audio currents, so that the latter currents are compelled to pass via lead 20 through the thermistor 2 to reach ground. The thermistor 2' is shown contained in a compartment 45 attached to the side of the concentric line 18', in close proximity to the thermistor 2, so as to be similarly affected by ambient temperature changes. The operation of the wattmeter self-balancing bridge apparatus is the same whether used with the bolometers in a wave guide as in Fig. 2 or in the concentric line of Fig. 3.

As many changes could be made in the above disclosed construction of wattmeter self-balancing bridge apparatus and many widely different embodiments of this invention could be made without departure from the scope thereof, it is intended that all matter contained in the above description or shown in the accompanying drawings shall be interpreted as illustrative and not in a limiting sense.

What is claimed is:

1. In a wattmeter self-balancing bridge apparatus, a first bridge having a bolometer in one arm thereof, a second bridge having a substantially identical bolometer in the corresponding arm thereof, each of said bridges having a respective amplifier connected therewith and forming therewith a regenerative loop, the loop constituting the first bridge and its amplifier oscillating at one frequency and the loop constituting the second bridge and its amplifier oscillating at a second frequency, means for supplying the radio frequency energy to be measured to the bolometer of said first bridge, means responsive to changes in resistance of said bolometer with changes in applied radio frequency power for changing the magnitude of energy at said one frequency, an indicator connected to said first bridge for indicating changes in the circulating energy at said one frequency and hence providing a measure of said radio frequency energy and means coupling the bolometer in the first bridge across the second bridge, said last-named means providing a path for the flow of energy at said second frequency from the second bridge loop through the bolometer of the first bridge to compensate for ambient temperature changes.

2. Apparatus for measuring radio frequency power comprising a pair of regenerative loop circuits, each of said circuits comprising an amplifier and a bridge having one pair of opposite points connected to the input of its amplifier and its other pair of opposite points connected to the output of its amplifier, each of said bridges having corresponding arms provided with substantially identical bolometers similarly subject to ambient temperature changes, one loop circuit oscillating at a first frequency and the other loop circuit oscillating at a second frequency, means for coupling the radio frequency power to be measured to the bolometer of one loop circuit, changes in the resistance of said bolometers changing the respective amplitudes of the signals at the output of said amplifiers, means responsive solely to energy at said first frequency connected across the output of the amplifier of said one loop circuit for indicating variations in energy at said first frequency, and means for coupling the amplifier output of the other of said pair of regenerative loop circuits to the bolometer of said one loop circuit.

3. Apparatus for measuring radio frequency power comprising a pair of regenerative circuits operating at differing frequencies, each of said circuits comprising an amplifier and a bridge having one pair of opposite points connected to the input of its amplifier and its other pair of opposite points connected to the output of its amplifier, each of said bridges having corresponding arms provided with substantially identical bolometers similarly subject to the ambient temperature changes, means for coupling the radio frequency power to be measured to the bolometer of one loop circuit, a meter connected across the output of the amplifier of said one loop circuit for indicating changes in the signal output of said one loop circuit, and means for coupling the signal output of the other of said loop circuits to the bolometer of said one loop circuit, the bolometer of said other loop circuit serving to regulate the signal output thereof, whereby the readings of said meter are automatically compensated for ambient temperature changes.

4. Apparatus for measuring radio frequency power comprising a first bridge including a thermal-sensitive resistance element in one arm thereof, the radio frequency power to be measured being coupled to said element, means for impressing a first alternating voltage of one frequency across one pair of opposite points of the first bridge, means responsive to changes in the voltage between the other pair of opposite points of the first bridge for varying the amplitude of the first alternating voltage, meter means for indicating variations in said amplitude, a second bridge including a thermal-sensitive resistance element in one arm thereof, said first and second bridge thermal-sensitive resistance elements being similarly affected by changes in ambient temperature, means for impressing a second alternating voltage of a different frequency from the first alternating voltage across one pair of opposite points of the second bridge, means responsive to changes in the voltage between the other pair of opposite points of the second bridge for varying the amplitude of the second alternating voltage, an adjustable direct current source connected across said one pair of opposite points of the second bridge for adjusting the amplitude of the second alternating voltage, and means for coupling said second alternating voltage across the thermal-sensitive element of the first bridge.

5. In power measuring apparatus, a bridge circuit, a thermal-responsive resistive element in one arm of the bridge circuit, means operatively associated with said element for coupling radio frequency energy to be measured to said element, means connected across one pair of opposite points of the bridge for coupling energy at one frequency to said element, means responsive to changes in resistance of said element for varying the energy at said one frequency supplied to the bridge, means connected across the bridge for indicating changes in the energy at said one frequency supplied to the bridge, and means connected to said element for coupling energy at a second frequency to said element, said last-named means varying in output in response to ambient temperature changes.

6. Apparatus as defined in claim 5 wherein said means responsive to changes in resistance of said element includes an amplifier, the input of which is connected across the other pair of opposite points of the bridge, and the output of which is connected to said means connected across one pair of opposite points of the bridge, the bridge and amplifier being connected so as to form a regenerative circuit oscillating at said one frequency.

7. Apparatus as defined in claim 6, wherein the means for coupling energy at said second frequency comprises a second regenerative loop circuit consisting of a bridge having a thermal-sensitive element and a connected amplifier.

8. Apparatus as defined in claim 7, wherein means is provided for supplying direct current power to the thermal-sensitive element of the bridge of said second regenerative loop to thereby control the amount of circulatory current in said element and hence indirectly the amount of power at said second frequency supplied to the thermal-sensitive element of the bridge of said first regenerative circuit.

9. Apparatus for measuring radio frequency power comprising a first bridge including a thermal-sensitive resistance element in one arm thereof, the radio frequency power to be measured being coupled to said element, means for impressing a first alternating voltage of one frequency across one pair of opposite points of the first bridge, means responsive to changes in the voltage between the pair of opposite points of the first bridge for varying the amplitude of the first alternating voltage, meter means for indicating variations in said amplitude, a second bridge including a thermal-sensitive resistance element in one arm thereof, said first and second bridge thermal-sensitive elements being similarly affected by changes in ambient temperature, means for impressing a second alternating voltage of a different frequency from the first alternating voltage across one pair of opposite points of the second bridge, means responsive to changes in the voltage between the other pair of opposite points of the second bridge for varying the amplitude of the second alternating voltage, and means for coupling said second alternating voltage across the thermal-sensitive element of the first bridge.

10. Apparatus for measuring the power of a radio frequency signal, said apparatus comprising a first thermal-sensitive resistance element, means coupled to said element for supplying a first signal thereto, means responsive to variations in the resistance of said first element for changing the voltage of said first signal, meter means for indicating the changes in the voltage of said first signal, the radio frequency signal to be measured being applied across said first element, and means including a second thermal-sensitive resistance element for producing a second signal varying in amplitude in response to changes in resistance of said second element, said first and second elements being similarly affected by changes in ambient temperature, said second signal being connected across said first element.

11. Apparatus as defined in claim 10 wherein said last-named means further includes means coupled to said second element for supplying said second signal thereto and means responsive to variations in the resistance of said second element for changing the voltage of said second signal supplied to said second element.

12. Apparatus for measuring radio frequency power comprising first and second bridge circuits, each of the bridge circuits including a thermal-sensitive resistance element in one arm thereof, the resistance of each of said elements being similarly affected by changes in ambient temperature, first and second amplifier means each responsive to a signal supplied to a pair of input terminals for delivering a corresponding voltage at a pair of output terminals, the voltages delivered at the respective output terminals of the first and second amplifier means differing in frequency, means for connecting the input terminals of said first amplifier means to one pair of opposite points of the first bridge circuit and the output terminals of the first amplifier means to the other pair of opposite points of the first bridge circuit, means for connecting the input terminals of the second amplifier means to one pair of opposite points of the second bridge circuit and the output terminals of the second amplifier means to the other pair of opposite points of the second bridge circuit, wherein the voltage delivered at their respective output terminals by each of said first and second amplifier means increases in accordance with a tendency for the temperature of the corresponding bridge elements to decrease, and vice versa, means for coupling the radio frequency power to be measured to the element of the first bridge circuit, meter means for indicating the amplitude of the voltage delivered at the output terminals of the first amplifier means, and means for coupling the voltage delivered at the output terminals of the second amplifier means across the element of the first bridge circuit.

13. Apparatus as in claim 12 wherein the voltages delivered at the output terminals of said first and second amplifier means are alternating voltages, and further including means for applying a direct voltage to said other pair of opposite points of the second bridge circuit.

References Cited in the file of this patent
UNITED STATES PATENTS

| | | |
|---|---|---|
| 2,163,403 | Meacham | Jan. 20, 1939 |
| 2,172,961 | Merz | Sept. 12, 1939 |
| 2,449,072 | Houghton | Sept. 14, 1948 |
| 2,495,268 | Leiphart | Jan. 24, 1950 |
| 2,565,922 | Howard | Aug. 28, 1951 |
| 2,617,843 | Houghton | Nov. 11, 1952 |